(12) United States Patent
Nannan et al.

(10) Patent No.: US 8,714,515 B2
(45) Date of Patent: May 6, 2014

(54) HYDRAULIC ACTUATING DEVICE FOR A SLIDING STEM CONTROL VALVE ASSEMBLY

(75) Inventors: Li Nannan, Tianjin (CN); Gao Chun, Tianjin (CN)

(73) Assignee: Emerson Process Management (Tianjin) Valces Co., Ltd, Tianjin (CN)

( * ) Notice: Subject to any disclaimer, the term of this patent is extended or adjusted under 35 U.S.C. 154(b) by 383 days.

(21) Appl. No.: 12/648,015

(22) Filed: Dec. 28, 2009

(65) Prior Publication Data
US 2011/0155250 A1 Jun. 30, 2011

(51) Int. Cl.
*F16K 31/122* (2006.01)

(52) U.S. Cl.
USPC ........ 251/31; 251/30.04; 251/61.4; 251/63.6; 251/324; 251/331; 137/553; 137/554; 137/556.3

(58) Field of Classification Search
USPC .............. 251/31, 331, 324, 30.01, 61.2, 61.4, 251/63.5, 63.6, 30.05; 137/82, 553, 554, 137/556.3
See application file for complete search history.

(56) References Cited

U.S. PATENT DOCUMENTS

| | | | | |
|---|---|---|---|---|
| 2,296,145 A * | 9/1942 | Christensen | ...... | 60/592 |
| 2,707,483 A * | 5/1955 | Shafer | ...... | 137/456 |
| 2,879,781 A * | 3/1959 | Gimson | ...... | 137/85 |
| 3,155,365 A * | 11/1964 | Hartung et al. | ...... | 251/25 |
| 3,427,930 A * | 2/1969 | Roberts et al. | ...... | 92/12 |
| 4,061,160 A | 12/1977 | Kashmer et al. | | |
| 4,096,881 A * | 6/1978 | Schabert et al. | ...... | 137/492 |
| 4,185,771 A | 1/1980 | Killias | | |
| 4,316,597 A * | 2/1982 | Goodman et al. | ...... | 251/58 |
| 4,445,424 A * | 5/1984 | Foster et al. | ...... | 92/5 R |
| 4,705,065 A * | 11/1987 | McNeely et al. | ...... | 137/484.6 |
| 4,852,773 A * | 8/1989 | Standlick et al. | ...... | 222/504 |
| 5,348,036 A * | 9/1994 | Oksanen et al. | ...... | 137/1 |
| 6,318,406 B1* | 11/2001 | Conley | ...... | 137/491 |
| 6,575,187 B2 | 6/2003 | Leys et al. | | |
| 2001/0037159 A1 | 11/2001 | Boger et al. | | |
| 2006/0289816 A1* | 12/2006 | Weingarten | ...... | 251/31 |

FOREIGN PATENT DOCUMENTS

| | | |
|---|---|---|
| CH | 616 218 A5 | 3/1980 |
| DE | 28 15 575 A1 | 1/1979 |
| GB | 2 388 889 A | 11/2003 |
| JP | 2010-276188 A | 12/2010 |

OTHER PUBLICATIONS

International Search Report for International Application No. PCT/CN2010/080404 mailed on Sep. 1, 2011.
Written Opinion of the International Searching Authority for International Application No. PCT/CN2010/080404 mailed on Sep. 1, 2011.

* cited by examiner

*Primary Examiner* — William McCalister
(74) *Attorney, Agent, or Firm* — Marshall, Gerstein & Borun LLP

(57) ABSTRACT

A hydraulic actuating device for a sliding stem control valve assembly is mounted between a control valve and an actuator housing. The hydraulic actuating device is connected to one of a control valve stem, an actuator stem, and a stem connector and the hydraulic actuating device moves either the control valve stem, the actuator stem, or the stem connector in response to varying hydraulic pressure within the hydraulic actuating device. The hydraulic actuating device may be used to override an actuator of the sliding stem valve during emergency operations, or to provide a backup actuator in the case of a primary actuator malfunction.

12 Claims, 6 Drawing Sheets

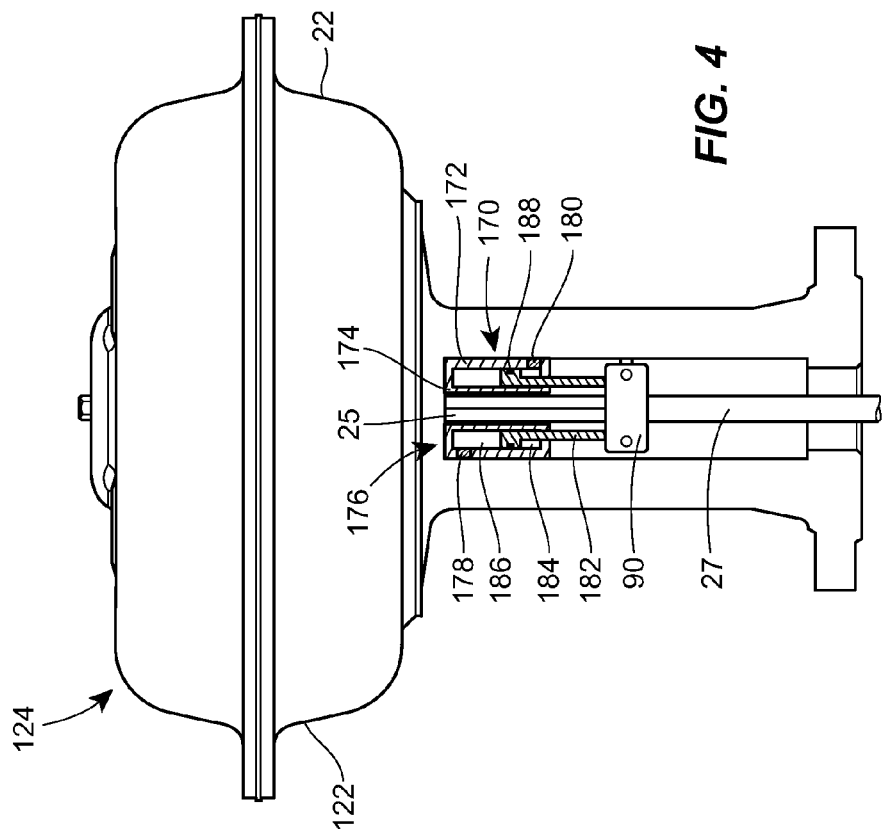
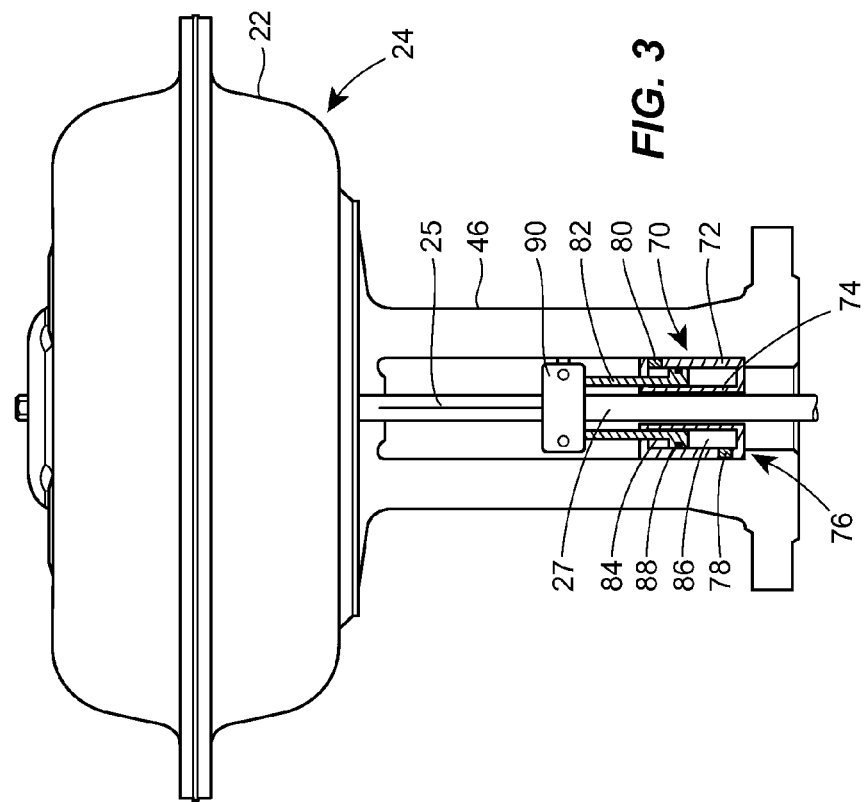

HYDRAULIC ACTUATING DEVICE FOR A SLIDING STEM CONTROL VALVE ASSEMBLY

FIELD OF THE DISCLOSURE

This disclosure relates generally to actuator override or backup devices for use with sliding stem control valve assemblies and, more particularly, to a hydraulic actuator override or backup device for sliding stem control valve assemblies, and to control valves incorporating such a device.

BACKGROUND

Many sliding stem process control valves are actuated with a control fluid (e.g., air) using well-known diaphragm type or piston type actuators, generally known as sliding stem valves. Sliding stem valves may also be actuated by using a portion of the process fluid flowing through the sliding stem valve, or by using an electric motor actuator. Actuators may be used to automate these control valves by supplying force and motion to open or close a valve. Sliding stem valves have a valve stem (e.g., a sliding stem) that moves a flow control member (e.g., a valve plug) between an open position and a closed position to control a flow of fluid through the valve. An actuator stem operatively couples a linear valve stem to the actuator (e.g., a pneumatic actuator, hydraulic actuator, electric actuator, etc.).

In operation, a control unit supplies the control fluid to the actuator to cause the actuator to position the valve stem or shaft and thus the flow control member to a desired position to regulate fluid flow through the valve. When the valve is closed, the flow control member is typically configured to engage an annular or circumferential seal that encircles the flow path through the valve to prevent fluid flow (e.g., in one or both directions) through the valve.

In process control systems, it may be necessary to override the position of the flow control member to the open position, the closed position, or any other desired position. For example, it may be necessary to open a valve to prevent overpressurization of a vessel or it may be necessary to close a valve to prevent a spill (e.g., a chemical spill) during emergency situations, power failures, or if the control fluid supply to the actuator is shut down. Some known override mechanisms use a hand wheel and screw mounted directly to the actuator so that an operator may manually operate the valve. However, these known override mechanisms only permit manual operation of some valves in one direction and, thus, cannot be used to manually operate the valve in the other direction. Such known manual override mechanisms generally cannot impart more than approximately 2 tons of force on the valve stem due to size and material strength limitations. Additionally, such known manual override mechanisms, such as a hand wheel and screw, must transform rotational energy (from the hand wheel) to linear energy on the valve stem. As a result, the valve stem, or connectors between the valve stem and the actuator stem, may be subject to undesirable rotational and/or shearing forces.

SUMMARY

In one embodiment, a sliding stem valve assembly comprises a control valve having a fluid inlet and a fluid outlet, the control valve having a valve plug that is movably positioned between the fluid inlet and the fluid outlet to control fluid flow through the control valve, the valve plug being connected to a valve stem. An actuator for moving the valve plug includes an actuator housing and a diaphragm mounted within the actuator housing, the diaphragm divides the actuator housing into at least two chambers. An actuator stem is connected to the diaphragm at one end and moves in a reciprocating manner in response to movement of the diaphragm, the actuator stem is connected to the valve stem at another end. A hydraulic sleeve is mounted between the control valve and the actuator housing, the hydraulic sleeve being operatively coupled to one of the valve stem, the actuator stem, or a stem connector, and the hydraulic sleeve being adapted to move the valve stem, the actuator stem, or the stem connector in response to varying hydraulic pressure within the hydraulic sleeve.

In another embodiment, a hydraulic press is mounted between a control valve and an actuator housing, the hydraulic press being mounted within, and attached to, a yoke that connects the actuator housing to the control valve. The hydraulic press is operatively coupled to a stem connector that is located between an actuator stem and a valve stem, the hydraulic press being adapted to move the stem connector, and thus the valve stem or the actuator stem, in response to varying hydraulic pressure within the hydraulic press.

In yet another embodiment, a hydraulic sleeve for a sliding stem control valve assembly includes an outer wall and an inner wall forming a sleeve housing, the sleeve housing is adapted to be attached the sliding stem control valve assembly. A hydraulic piston is movably disposed in the sleeve housing, the hydraulic piston being movable along a longitudinal axis of the sleeve housing. One of an actuator stem and a valve stem passes through the hydraulic sleeve and the hydraulic piston is attached to one of the actuator stem and the valve stem.

A method of overriding (or backup operation of) a sliding stem valve actuator includes providing a hydraulic sleeve, attaching the hydraulic sleeve to one of an actuator stem, a control valve stem and a stem connector of a sliding stem control valve; and actuating the hydraulic sleeve to move one of the actuator stem, the control valve stem, and the stem connector to position a valve plug within a control valve.

BRIEF DESCRIPTION OF THE DRAWINGS

FIG. 3 is a longitudinal cross-sectional view of the yoke section of the sliding stem control valve assembly of FIG. 2, including a hydraulic actuating device constructed in accordance with the teachings of the disclosure, the hydraulic actuating device taking the form of a hydraulic sleeve.

FIG. 4 is a longitudinal cross-sectional view of the yoke section of the sliding stem control valve assembly of FIG. 2, including an alternative embodiment of a hydraulic sleeve.

DETAILED DESCRIPTION

Figure 1:
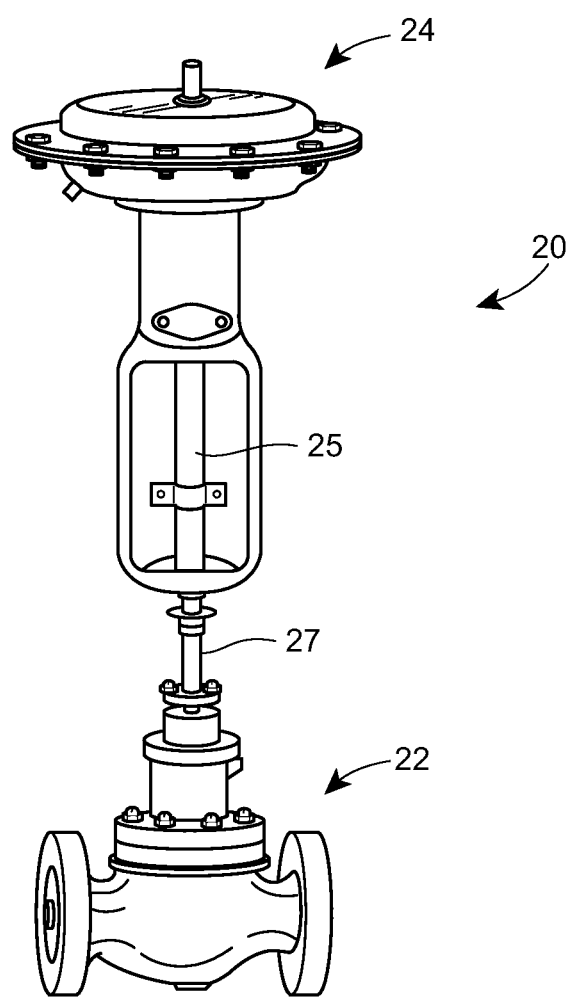
FIG. 1 is a perspective view of a sliding stem control valve assembly.

Referring now to the drawings and with specific reference to FIG. 1, a sliding stem valve assembly is generally referred to by reference numeral 20. The sliding stem valve assembly 20 includes a control valve 22 to which a valve actuator 24 is attached. The valve actuator 24 moves an actuator stem 25 in a reciprocating fashion. The actuator stem 25 is, in turn, coupled to a control valve stem 27. Thus, the control valve stem 27 moves in conjunction with the actuator stem 25 to control a flow of process fluid through the control valve 22, as discussed further hereinafter.

Figure 2:
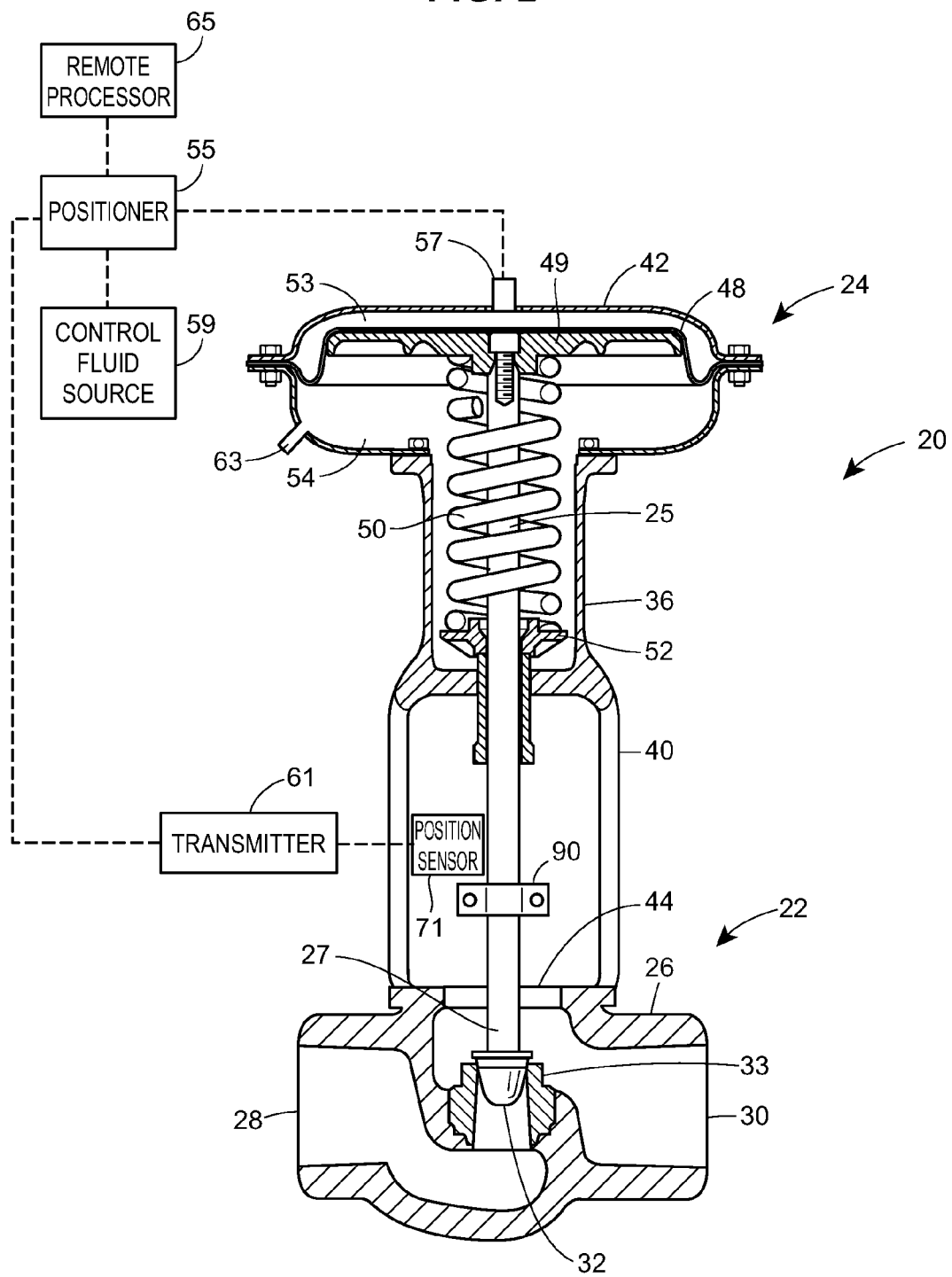
FIG. 2 is a longitudinal cross-sectional view of a sliding stem control valve assembly.

Referring now to FIG. 2, the control valve 22 is shown in further detail to include a housing 26 having an inlet 28 and an outlet 30. While not shown, it is to be understood that the control valve 22 is adapted to allow process fluid to flow from the inlet 28 to the outlet 30, and that by adjusting the position of a valve plug 32 slidably disposed within the housing 26, the volume and rate at which the fluid flows through the control valve 22 can be adjusted as well. The position of the valve plug 32 is varied by adjusting the position of the control valve stem 27, which is connected to the valve plug 32. More specifically, by adjusting the position of the control valve stem 27, the position of the valve plug 32 relative to a valve seat 33 positioned between the inlet 28 and outlet 30 is also adjusted. As a result of the distance between the valve plug 32 and the valve seat 33, a regulated amount of fluid passes through the space between the valve plug 32 and the valve seat 33.

The actuator 24 adjusts the position of the actuator stem 25 and thus the position of the control valve stem 27 and the valve plug 32, because the actuator stem 25 is operatively coupled to the control valve stem 27. For example, the actuator stem 25 and the control valve stem may be operatively coupled by a stem connector or position indicator 90. The actuator 24 includes a housing 36 in which the actuator stem 25 reciprocates. More specifically, in the depicted embodiment, the housing 36 is attached to a yoke 40 at a base of the housing 36, and a diaphragm casing 42 at a top of the housing 36. The yoke 40 includes a bottom portion 44 adapted to be mounted to the control valve 22.

Movement of the actuator stem 25 is controlled by spring and fluid pressure. The actuator stem 25 is connected to a diaphragm 48 positioned within the diaphragm casing 42. A spring 50 is positioned around the actuator stem 25 and biases the diaphragm 48 upwardly in FIG. 2, by acting on both the diaphragm 48 (or diaphragm plate 49) and a spring seat 52. In this embodiment, a compression spring (i.e., a spring that is compressed under force and therefore attempts to return it its uncompressed condition) is depicted. However, an extension spring may be used in other embodiments (i.e., a spring that is extended under force and therefore attempts to return to its unextended position). The spring 50 in the embodiment shown in FIG. 2 therefore biases the diaphragm 48, the actuator stem 25, the control valve stem 27, and the valve plug 32 upwardly. Accordingly, the control valve 22 could be provided in the form or either a normally open or normally closed valve, depending on the relative relationship between the valve plug 32 and the valve seat 33. The embodiment shown in FIG. 2 is a normally open valve because the spring bias from the spring 50 attempts to force the valve plug 32 away from the valve seat 33. However, as will be evident to one of ordinary skill in the art, if the valve plug 32 were positioned beneath the valve seat 33 in FIG. 2, then the spring bias from the spring 50 would attempt to force the valve plug 32 towards the valve seat 33, which would result in a normally closed valve. Relative positions of the valve plug 32 and valve seat 33 and different types of springs 50 may be combined to suit almost any desired environment.

For example, as will be evident to one of ordinary skill in the art, the spring 50 may bias the diaphragm 48 downwardly, towards the valve seat 33. This may be accomplished by either using a spring 50 that is an extension spring (as opposed to a compression spring), or by placing the spring 50 on the opposite side of the diaphragm 48 (i.e., between the diaphragm 48 and a top of the actuator housing 42).

In order to move the valve plug 32, and thus control the position of the control valve 22, control fluid pressure is adjusted in the diaphragm casing 42. More specifically, the diaphragm 48 divides the diaphragm casing 42 into upper and lower chambers 53 and 54, respectively. By adjusting the control fluid pressure, e.g., air pressure, in the upper chamber 53 through a control line 57, the diaphragm 48 is caused to move upwardly or downwardly depending on the relative forces between the spring 50 and control fluid pressure in the upper chamber 53.

The actuator 24 depicted is of but one type of actuator adapted to adjust the position of the control valve stem 27 and plug of the control valve 22. Other forms of actuators are possible, and included within the scope of the present application.

Using structures such as that described above, the position of the plug 32 can be adjusted relative to the valve seat 33 to adjust the flow of fluid through the control valve 22. However, in order to accurately position the plug 32, and thus accurately control the flow of fluid through the control valve 22, a positioner 55 may be provided. One example of a positioner is the FIELDVUE® positioner manufactured by Fisher Controls and another example of a positioner is shown in U.S. Patent Publication No. 2001/0037159, which is hereby incorporated by reference. The positioner 55 may include a fluid inlet connected to a pressurized control fluid source 59 and the control line 57. The positioner 55 may be adapted to receive a signal from a transmitter 61 that generates a position signal, as the actuator stem 25 (or control valve stem 27) moves up and down, from position sensor 71. The transmitter may send the signal via a wired connection, or a wireless connection, such as radio, WiFi, or any other type of electromagnetic wave. In turn, the position of the plug 32 may be determined by analyzing the position signal, and if the plug 32 is not positioned appropriately, a corresponding correction signal can be generated by the positioner 55 and sent though the control line to actuate the actuator stem 25 (or control valve stem 27) by changing control fluid pressure in the upper chamber 53. More specifically, the positioner 55 may include a processor and memory; the received signal may be compared by the processor to a set point stored in the memory, to thus generate the correction signal. Alternatively, the positioner 55 may communicate the received signal to a remote processor 65, by direct wiring, RF communication, or the like, with the remote processor 65 then generating and transmitting the correction signal to the positioner 55.

As control fluid pressure in the upper chamber 53 is increased, the diaphragm 48 moves downward as the control fluid pressure in the upper chamber 53 overcomes the force generated by the spring 50. As the diaphragm 48 moves downward, towards the valve seat 33, volume of the lower chamber 54 decreases and volume of the upper chamber 53 increases. The increased volume of the upper chamber 53 is filled by incoming control fluid through the control line 57. The lower chamber includes an actuator vent 63 to allow fluid to escape from the lower chamber 54 as the volume of the lower chamber 54 decreases. Likewise, when the control fluid pressure in the upper chamber 53 decreases, the volume of the upper chamber 53 decreases while the volume of the lower chamber 54 increases. Control fluid vents from the upper chamber 53 by way of the control line 57 as the volume of the upper chamber decreases and fluid enters the lower chamber 54 through the actuator vent 63 to fill the expanding volume of the lower chamber 54.

As shown in FIG. 3, the sliding stem valve assembly 20 includes a hydraulic actuating device such as a hydraulic sleeve 70 for overriding the actuator 24 in the case of an actuator 24 failure, for operating the control valve 22 in a backup mode, or for any other situation that requires actuation of the control valve 22 when the actuator 24 is unable to perform the operation. The hydraulic sleeve 70 includes an outer wall 72 and an inner wall 74 forming a sleeve housing 76. The sleeve housing 76 includes a fluid inlet 78 and a fluid outlet 80 for injecting fluid into, and removing fluid from the hydraulic sleeve 70. A hydraulic piston 82 is slidably disposed in the sleeve housing 76. The hydraulic piston 82 divides an interior of the sleeve housing 76 into two chambers, a low pressure chamber 84, and a high pressure chamber 86. The hydraulic piston 82 may include one or more seals 88 for fluidly isolating the low pressure chamber 84 from the high pressure chamber 86. The hydraulic piston 82 may be connected to the stem connector or position indicator 90, which is securely attached to the actuator stem 25 and/or the control valve stem 27. Alternatively, the hydraulic piston 82 may be securely attached directly to either the actuator stem 25 or the control valve stem 27.

During operation, fluid is injected through the fluid inlet 78 and into the high pressure chamber 86. As pressure increases in the high pressure chamber 86, the hydraulic piston 82 is forced towards the actuator 24, thus forcing the control valve 22 (not shown in FIG. 3) towards the open position. The hydraulic sleeve 70 advantageously provides a very large opening force, exceeding 50000N in some cases, for overcoming any resistance due to, for example, a material failure or other binding in the control valve 22 or excessive fluid back pressure on the valve plug 32. Moreover, the hydraulic sleeve 70 may be used to override the actuator 24 in the case of an actuator malfunction or to operate the control valve 22 in a back up mode. Additionally, the hydraulic sleeve 70 produces a force aligned with longitudinal axes of the control valve stem 27 and the actuator stem 25. Thus, no torsional or shear forces are imparted to either the control valve stem 27, or the actuator stem 25.

FIG. 4 illustrates an alternative embodiment of a hydraulic actuating device in the form of a hydraulic sleeve 170. In this case, the hydraulic sleeve 170 is disposed between the stem connector or position indicator 90 and the actuator housing 122. The hydraulic sleeve 170 includes an outer wall 172 and an inner wall 174 forming a sleeve housing 176. The sleeve housing 176 includes a fluid inlet 178 and a fluid outlet 180 for injecting and removing fluid from the hydraulic sleeve 170. A hydraulic piston 182 is movably disposed within the sleeve housing 176. The hydraulic piston 182 divides an interior of the sleeve housing 176 into two chambers, a low pressure chamber 184, and a high pressure chamber 186. The hydraulic piston 182 may include one or more seals 188 for fluidly isolating the low pressure chamber 184 from the high pressure chamber 186. The hydraulic piston 182 may be connected to the stem connector or position indicator 90, which is securely attached to the actuator stem 25 and/or the control valve stem 27. Alternatively, the hydraulic piston 182 may be securely attached directly to either the actuator stem 25 or the control valve stem 27.

The hydraulic sleeve 170 shown in FIG. 4 is operated like the hydraulic sleeve 70 shown in FIG. 3. However, the hydraulic sleeve 170 is inverted relative to the hydraulic sleeve 70 and the hydraulic sleeve 170 is positioned between the actuator 124 and the stem connector or position indicator 90. Thus, the hydraulic piston 182 moves downward in FIG. 4 (i.e., away from the actuator). As a result, the hydraulic sleeve 170 shown in FIG. 4 actuates to close the control valve 22 (not shown in FIG. 4).

Figure 5:
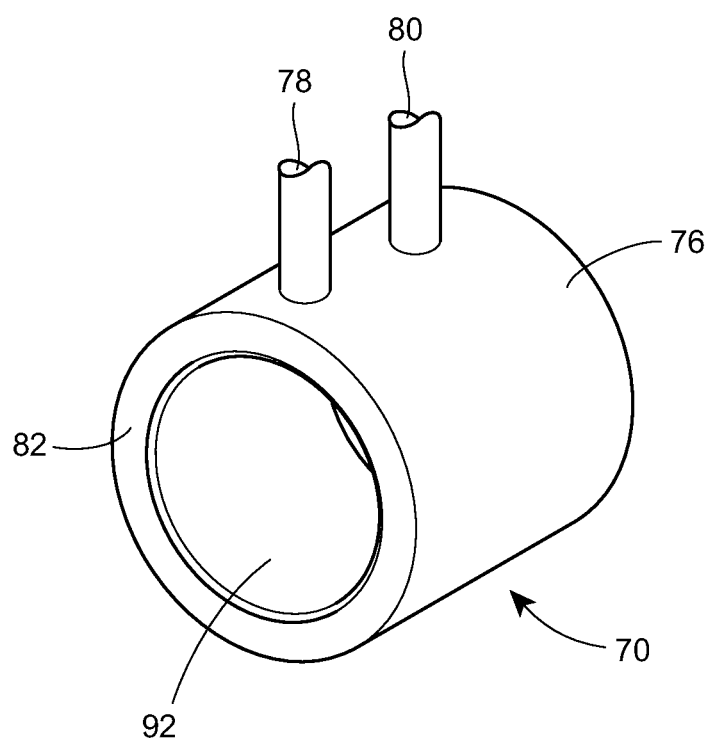
FIG. 5 is a perspective view of the hydraulic actuating device of FIGS. 3 and 4.

FIG. 5 illustrates one embodiment of the hydraulic sleeve 70. The hydraulic sleeve 70 includes the sleeve housing 76, the hydraulic piston 82, a fluid inlet 78, and a fluid outlet 80. The hydraulic piston 82 moves along a longitudinal axis of the sleeve housing 76. The sleeve housing 76 includes a hollow space 92 thorough which either the actuator stem 25 or the control valve stem 27 may pass. The sleeve housing 76 shown in FIG. 5 is cylindrical in shape. However, other shapes are possible. For example, the sleeve housing 76 may have an opening lengthwise for ease of installation. The sleeve housing 76 may also take on other cross-sectional shapes, for example, triangular, square, rectangular, or any other polygonal cross-sectional shapes, as well as oval or oblong cross-sectional shapes. Still further one or more hydraulic presses or pillars could be used as opposed to a single sleeve housing 76.

Figure 6:
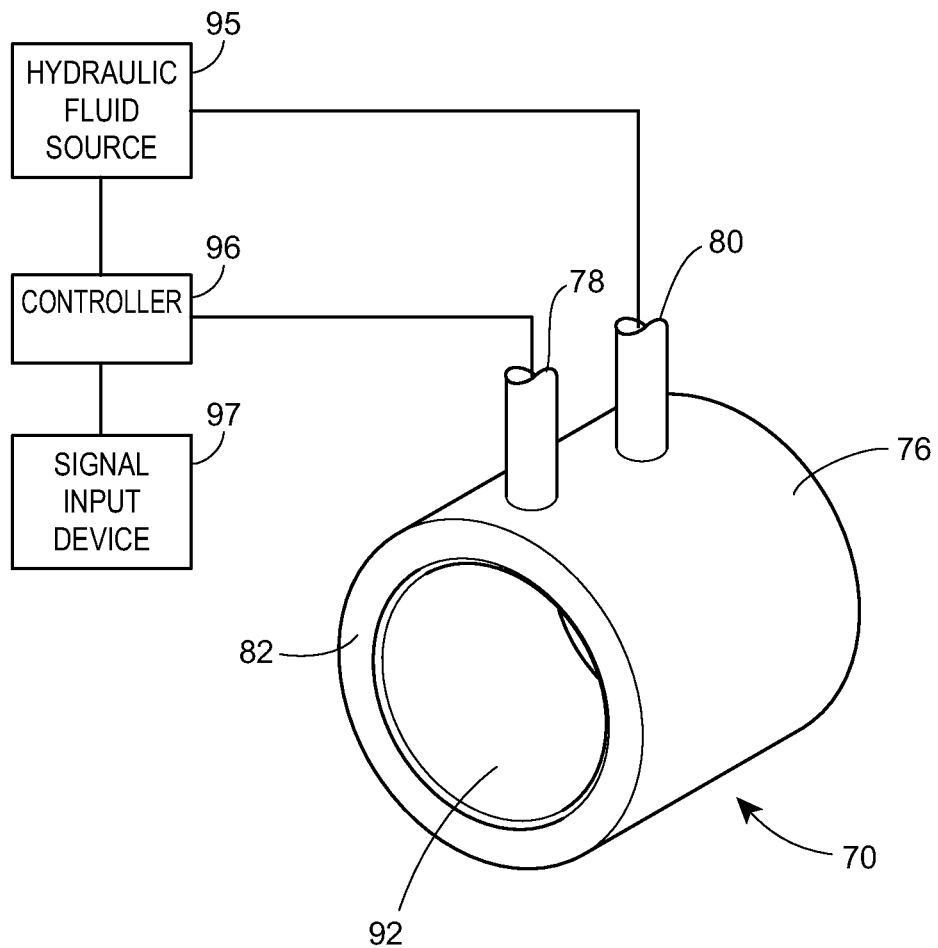
FIG. 6 is a schematic representation of the hydraulic actuating device of FIG. 5 within an actuator override or backup system.

FIG. 6 illustrates the hydraulic sleeve 70 schematically in an actuator override or backup system 94. The system 94 may include a hydraulic fluid source 95 that is operatively connected to a controller 96. The controller 96 may receive a signal from a signal input device 97, such as a computer, a keyboard, a mouse, a voice recognition system, or any other device suitable for generating an input signal. The controller 96 may control hydraulic fluid pressure to the fluid inlet 78 to extend or retract the hydraulic piston 82. Excess fluid from the low pressure chamber 84, 184 (FIGS. 3 and 4) may vent back to the hydraulic fluid source 95, or to some other hydraulic fluid holding device.

Figure 7:
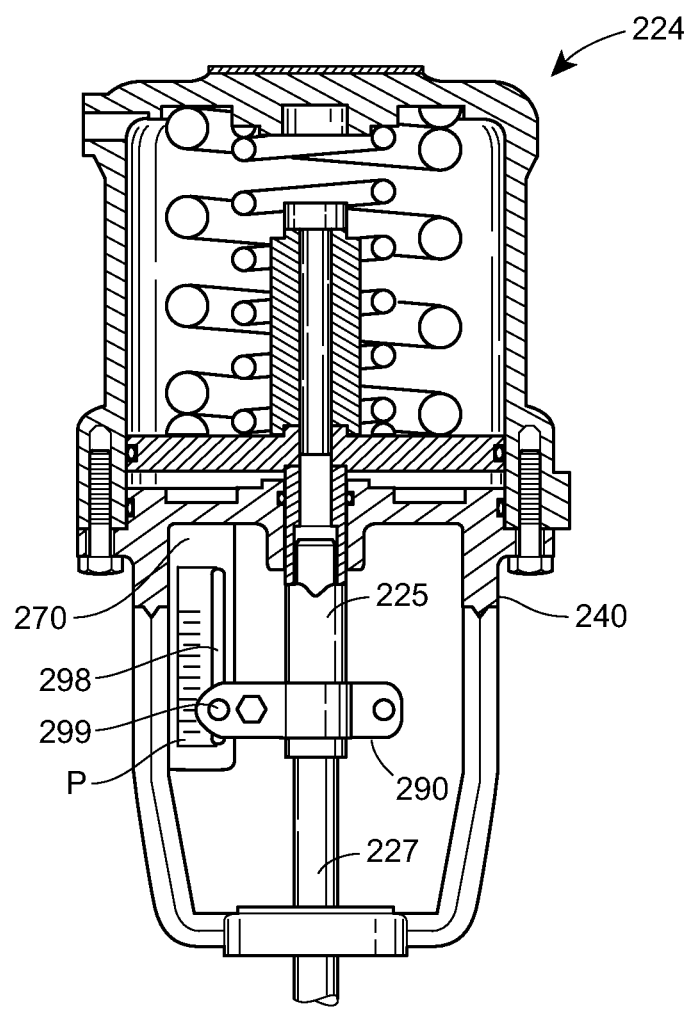
FIG. 7 is a longitudinal cross-sectional view of a yoke section of a sliding stem control valve assembly, including yet another alternate embodiment of a hydraulic actuating device constructed in accordance with the teachings of the disclosure, the hydraulic actuating device taking the form of a hydraulic press.

FIG. 7 illustrates an alternate embodiment of a hydraulic actuating device in the form of a hydraulic press 270. The hydraulic press 270 may be mounted within the yoke 240 positioned between the actuator 224 and the control valve (not shown in FIG. 7). The hydraulic press 270 may be connected to the yoke 240 instead of the actuator 224 to anchor the hydraulic press 270. The hydraulic press 270 may also be attached to the stem connector or position indicator 290. The hydraulic press 270 may move the stem connector or position indicator 290, and thus the actuator stem 225 and the valve stem 227, up and down in FIG. 7 by way of a slot 298 and connector 299. Other types of connections between the hydraulic press 270 and the stem connector or position indicator 90 are possible and well within the capabilities of one of ordinary skill in the art. The hydraulic press 270 may also include a visual position scale P that allows an operator or technician to determine the position of the control valve by visually observing the relative position of the stem connector or position indicator 290 with respect to the visual position scale P. The hydraulic press 270 may be installed at virtually any location within the yoke 240 and thus the position of the hydraulic press 270 may be tailored to each particular control valve assembly. Moreover, the hydraulic press 270 is adaptable to virtually all known yoke configurations and thus may be retrofitted to existing control valve assembly configurations.

The foregoing detailed description has been given for clearness of understanding only and no unnecessary limitations should be understood therefrom, as modifications will be obvious to those skilled in the art.

The invention claimed is:

1. A sliding stem valve assembly comprising:
a control valve having a fluid inlet and a fluid outlet, the control valve comprising a valve plug that is movably positioned between the fluid inlet and the fluid outlet to control fluid flow through the control valve, the valve plug being connected to a control valve stem;

an actuator for moving the valve plug, the actuator comprising an actuator housing and a diaphragm mounted within the actuator housing, the diaphragm dividing the actuator housing into at least two chambers, an actuator stem being operatively coupled to the diaphragm at one end and moving in a reciprocating manner in response to movement of the diaphragm, the actuator stem being connected to the control valve stem at another end; and a hydraulic sleeve mounted between the control valve and the actuator housing, the hydraulic sleeve being connected to one of the control valve stem and the actuator stem, the hydraulic sleeve moving either the control valve stem or the actuator stem in response to varying hydraulic pressure within the hydraulic sleeve, wherein the hydraulic sleeve includes a sleeve housing and a hydraulic piston, the sleeve housing having an interior volume defined between a longitudinal inner surface of an outer wall and a longitudinal outer surface of an inner wall, the control valve stem being slidably disposed within a longitudinal opening defined by a longitudinal inner surface of the inner wall, wherein an inner surface of the hydraulic piston is adjacent to the outer surface of the inner wall of the sleeve housing, and wherein a first end of the hydraulic piston is slidably disposed within the interior volume of the sleeve housing and a second end of the hydraulic piston is slidably disposed outside of the interior volume of the sleeve housing;

wherein the hydraulic piston is an elongated hollow cylinder having a flange portion at the first end, the flange portion sealingly engaging the inner surface of the outer wall to divide the interior volume into a low pressure chamber and a high pressure chamber, wherein pressure changes in the low pressure chamber and the high pressure chamber cause the hydraulic piston to displace within the sleeve housing.

2. The valve of claim 1 further comprising a yoke disposed between the actuator and the control valve, the hydraulic sleeve being mounted within the yoke.

3. The valve of claim 1, wherein the inner wall and the outer wall of the hydraulic sleeve are each cylindrical in shape, and wherein the hydraulic piston is an elongated hollow cylinder.

4. The valve of claim 1 further comprising a position indicator attached to one of the actuator stem and the control valve stem.

5. The valve of claim 4, wherein the hydraulic sleeve is attached to the position indicator.

6. The valve of claim 4, wherein the hydraulic sleeve is positioned between the control valve and the position indicator.

7. The valve of claim 4, wherein the hydraulic sleeve is positioned between the position indicator and the actuator.

8. The valve of claim 1, wherein the hydraulic sleeve operates to open the control valve.

9. The valve of claim 1, wherein the hydraulic sleeve operates to close the control valve.

10. The valve of claim 1, wherein the hydraulic sleeve overrides the actuator.

11. The valve of claim 1, wherein the hydraulic sleeve has a cross-sectional shape comprising one of circular, triangular, square, rectangular, or polygonal.

12. The valve of claim 1, wherein the sleeve housing has a first end and a longitudinally opposite second end, and wherein in a first position, the first end of the hydraulic piston is adjacent to the first end of the sleeve housing and in a second position, the first end of the hydraulic piston is adjacent to the second end of the sleeve housing.

\* \* \* \* \*